US006688579B2

(12) United States Patent
Grytz

(10) Patent No.: US 6,688,579 B2
(45) Date of Patent: Feb. 10, 2004

(54) SOLENOID VALVE FOR CONTROLLING A FUEL INJECTOR OF AN INTERNAL COMBUSTION ENGINE

(75) Inventor: Uwe Grytz, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/221,285

(22) PCT Filed: Dec. 15, 2001

(86) PCT No.: PCT/DE01/04752

§ 371 (c)(1), (2), (4) Date: Dec. 23, 2002

(87) PCT Pub. No.: WO02/053905

PCT Pub. Date: Jul. 11, 2002

(65) Prior Publication Data

US 2003/0178593 A1 Sep. 25, 2003

(30) Foreign Application Priority Data

Jan. 8, 2001 (DE) ........................................ 101 00 422

(51) Int. Cl.$^{7}$ .......................... F16K 31/02; F02M 51/06
(52) U.S. Cl. .............................. 251/129.16; 251/129.18
(58) Field of Search ........... 251/129.15, 129.16–129.22

(56) References Cited

U.S. PATENT DOCUMENTS 5,009,390 A * 4/1991 McAuliffe, Jr. et al. ..................... 251/129.21
5,513,832 A * 5/1996 Becker et al. ......... 251/129.18
6,305,355 B1 * 10/2001 Hoffmann et al. ..... 251/129.16

FOREIGN PATENT DOCUMENTS

| | | |
|---|---|---|
| DE | 197 08 104 | 9/1998 |
| EP | 0 851 114 | 7/1998 |
| EP | 0 851 116 | 7/1998 |
| WO | 98 25025 | 6/1998 |
| WO | 99 57429 | 11/1999 |
| WO | 00 25018 | 5/2000 |

* cited by examiner

*Primary Examiner*—Paul J. Hirsch
(74) *Attorney, Agent, or Firm*—Kenyon & Kenyon

(57) ABSTRACT

A solenoid valve for controlling a fuel injector of an internal combustion engine having an electromagnet, a movable armature having an armature plate and an armature pin, and a control valve element which is moved with the armature and works together with a valve seat, for opening and closing a fuel drain channel of a control pressure chamber of the fuel injector, is provided. The armature plate is mounted on the armature pin so that it is movable by sliding under the effect of its inertial mass in the closing direction of the control valve element against the tension of a return spring acting on the armature plate. In order to be able to easily set the maximum slide path of the armature plate, an actuator is provided on the armature plate which is arranged on a section of the armature plate facing away from the electromagnet and is adjustable in the sliding direction of the armature plate relative to a face of the armature plate facing the electromagnet.

8 Claims, 3 Drawing Sheets

SOLENOID VALVE FOR CONTROLLING A FUEL INJECTOR OF AN INTERNAL COMBUSTION ENGINE

BACKGROUND INFORMATION

Figure 1:
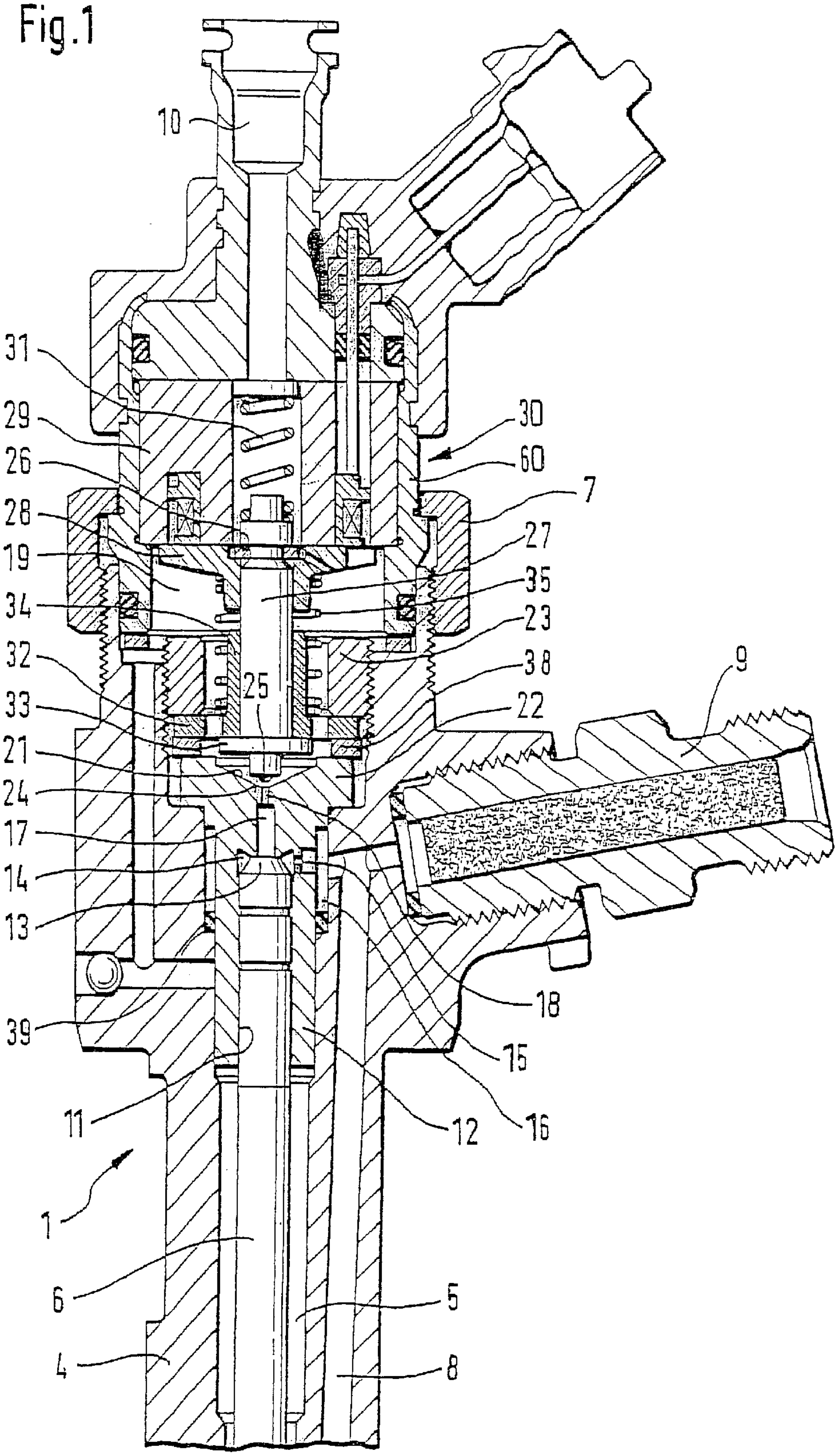

The present invention relates to a solenoid valve for controlling a fuel injector of an internal combustion engine according to the definition of the species in claim 1.

Such a solenoid valve, known from German Patent Application 197 08 104 A1, for example, is used to control the fuel pressure in the control pressure chamber of a fuel injector, for example in the injector of a common rail injection system. The movement of a valve plunger, using which an injection opening of the fuel injector is opened or closed, is controlled via the fuel pressure in the control pressure chamber. The known solenoid valve has an electromagnet arranged in a housing part, a movable armature, and a control valve element which is moved using the armature, is acted upon by a closing spring in the closing direction, works together with a valve seat of the solenoid valve and thus controls the fuel discharge out of the control pressure chamber. A known disadvantage of solenoid valves is the armature bounce. When the magnet is switched off, the armature, and with it the control valve element, is accelerated by the closing spring of the solenoid valve toward the valve seat in order to seal off a fuel drain channel out of the control pressure chamber. The impact of the control valve element on the valve seat may result in a disadvantageous oscillation and/or bounce of the control valve element on the valve seat, due to which the control of the injection procedure is impaired. In the solenoid valve known from German Patent Application 197 08 104 A1, the armature is therefore implemented in two parts, having an armature pin and an armature plate mounted so it slides on the armature pin, so that, upon the impact of the control valve element on the valve seat, the armature plate moves further against the tension of a return spring. The return spring subsequently conveys the armature plate back to its starting position against a stop of the armature pin. The effectively braked mass, and therefore the kinetic energy of the armature striking the valve seat, which causes bounce, are reduced through the two-part embodiment of the armature; however, the armature plate may disadvantageously post-oscillate on the armature pin after the solenoid valve is closed.

Since control of the solenoid valve only leads to a defined injection quantity if the armature plate no longer post-oscillates, measures are necessary in order to reduce the post-oscillation of the armature plate. This is particularly necessary to achieve shorter time intervals between, for example, a pre-injection and a main injection. To achieve this object, the related art uses a damping device which includes a stationary part and a part moved using the armature plate. The stationary part is formed by an overtravel stop which delimits the maximum path length by which the armature plate may move on the armature pin. The movable part is formed by a projection of the armature plate facing the stationary part.

The overtravel stop may be formed by the face of a slider which guides the armature pin and is fixedly clamped in the housing of the solenoid valve or by a part mounted in front of the slider, for example an annular disk. When the armature plate approaches the overtravel stop, a hydraulic damping chamber is produced between the faces of the armature plate and the overtravel stop, which face each other. The fuel contained in the damping chamber generates a force which counteracts the movement of the armature plate, so that the post-oscillation of the armature plate is strongly damped.

In the known solenoid valves, the precise setting of the maximum slide path which is to be available to the armature plate on the armature pin is problematic. The maximum slide path, also called overtravel, is set by replacing the overtravel disk, through additional spacer disks, or by grinding down the overtravel stop. Since these achievements of the object require setting which is to be performed incrementally, they are costly and difficult to automate and lengthen the machining periods in manufacturing.

ADVANTAGES OF THE INVENTION

The solenoid valve according to the present invention having the characterizing features of claim 1 avoids the disadvantages arising in the related art. Through the arrangement of an actuator, which is arranged on a section of the armature plate facing away from the electromagnet and is adjustable in the sliding direction of the armature plate relative to the face of the armature plate facing the electromagnet, the maximum slide path of the armature plate on the armature pin may advantageously be set very easily, without parts having to be replaced or ground down multiple times. A setting procedure which includes multiple steps may be dispensed with. The achievement of the object proposed is particularly usable in a cost-effective way in automated serial production.

Advantageous embodiments and refinements of the present invention are made possible through the features contained in the sub-claims.

Therefore, the damping device may advantageously be formed by a hydraulic damping chamber between a face of the actuator and a face, which faces the face of the actuator, of the stationary part of the damping device fixed in the housing of the solenoid valve. The actuator may have, on its face facing the stationary part, an axial through-opening for passing through the armature pin.

It is particularly advantageous to arrange the actuator adjustably on the armature plate via a thread. By rotating the actuator when the armature plate is fixed or by rotating the armature plate when the actuator is fixed, the maximum slide path of the armature plate on the armature pin may be set precisely in a simple way.

The actuator is preferably implemented as a screw element provided with an internal thread, which is screwed onto a section of the armature plate. penetrated by the armature pin and provided with an external thread.

The precision of the setting results in this case from the thread pitch. The axial adjustment path of the actuator in relation to the face of the armature plate facing the electromagnet is advantageously implemented as less than half a millimeter for one full rotation of the actuator. The very flat thread pitch advantageously causes self locking of the thread, so that the actuator is fixed in its limit position. The actuator may additionally be lockable in the set position on the armature plate.

In an exemplary embodiment which is particularly easy to assemble, the return spring is supported on one end in the housing of the solenoid valve and on the other end against the actuator.

DRAWINGS

Exemplary embodiments of the present invention are illustrated in the drawing and explained in the following description.

Figure 2:
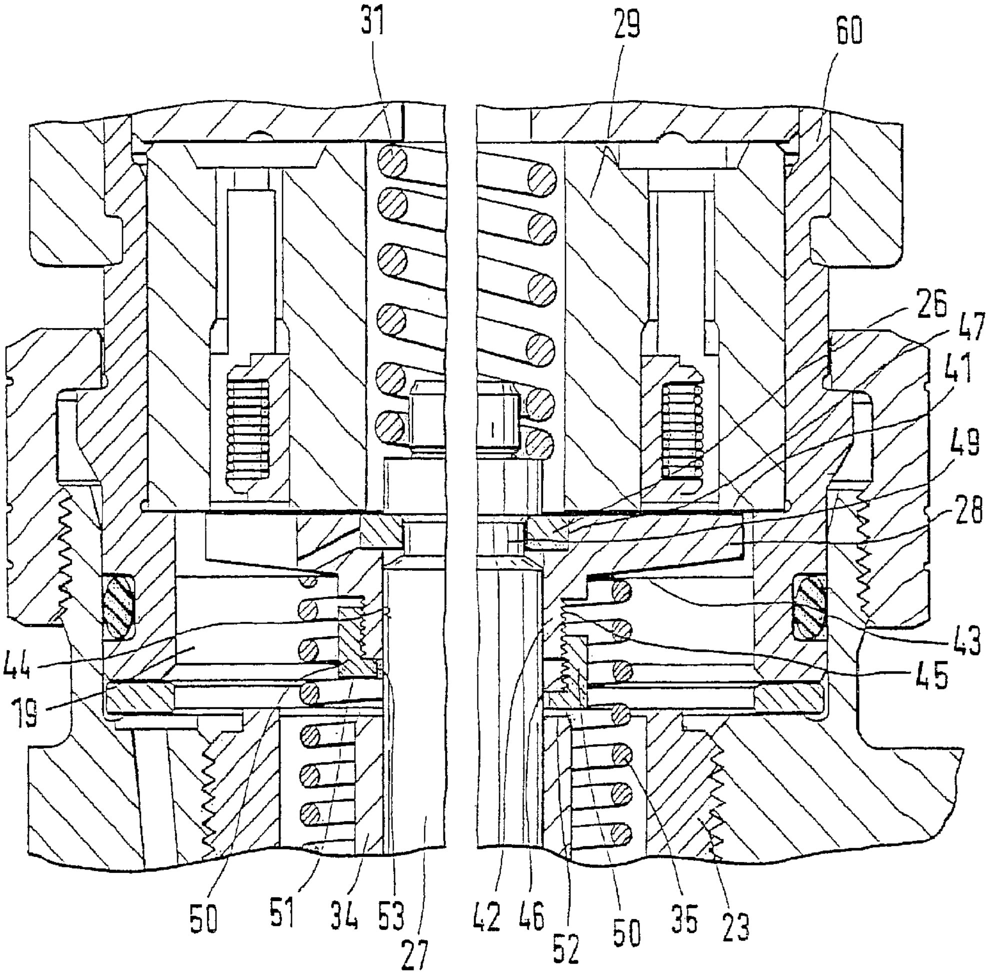
Figure 3:
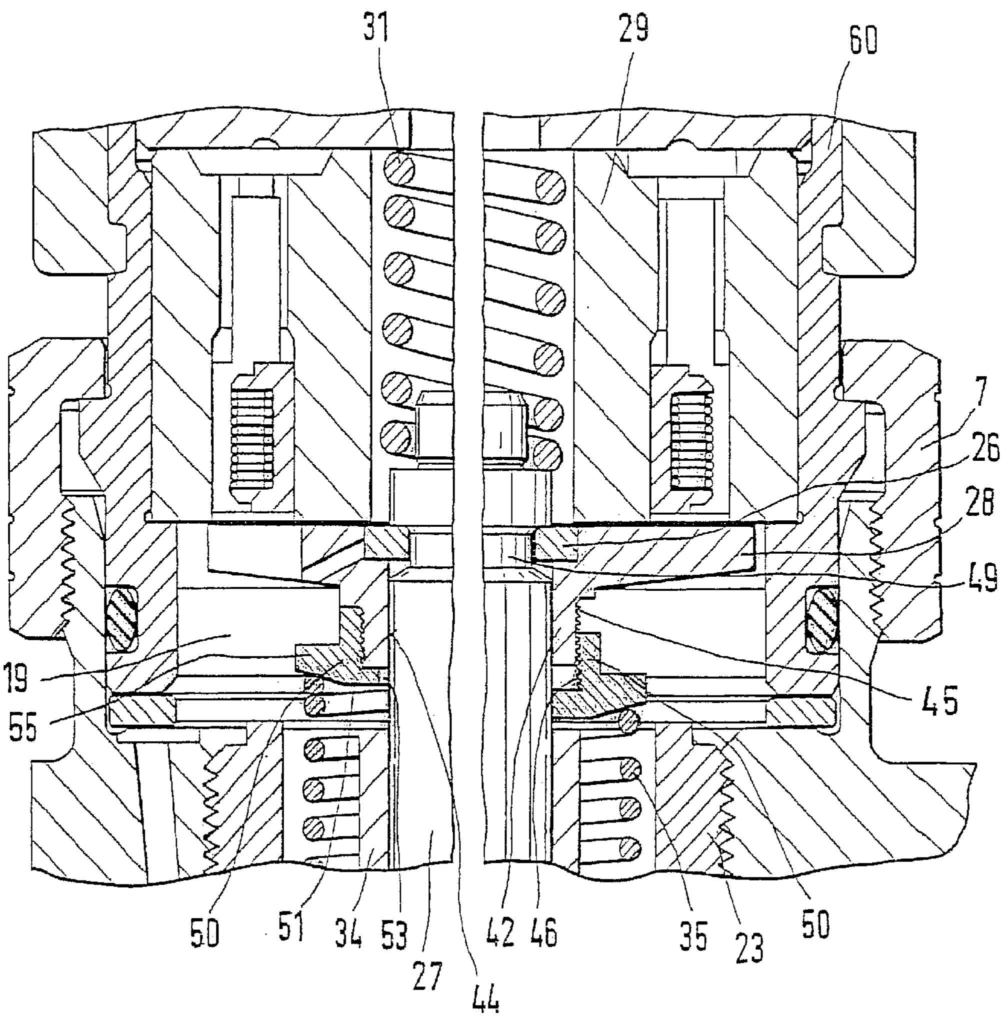

FIG. 1 shows a cross-section through the upper part of a fuel injector known from the related art having a solenoid valve, FIG. 2 shows a detail from a cross-section through the solenoid valve according to the present invention having the actuator, FIG. 3 shows a detail from a cross-section through the solenoid valve according to the present invention according to a second exemplary embodiment.

DESCRIPTION OF THE EXEMPLARY EMBODIMENTS

FIG. 1 shows the upper part of a fuel injector 1 known from the related art, which is intended for use in a fuel injection system equipped with a high-pressure fuel storage cylinder which is continuously supplied with high-pressure fuel by a high-pressure delivery pump. Fuel injector 1, illustrated, has a valve housing 4 having a longitudinal bore 5, in which a valve plunger 6 is arranged, one end of which acts on a valve needle arranged in a nozzle body (not shown). The valve needle is arranged in a pressure chamber which is supplied with fuel standing under high pressure via a pressure bore 8. During an opening stroke movement of valve plunger 6, the valve needle is lifted against the closing force of a spring by the high pressure of the fuel in the pressure chamber, which is continuously applied to a pressure shoulder of the valve needle. The fuel is injected into the combustion chamber of the internal combustion engine through an injection opening which is then connected to the pressure chamber. The valve needle is pressed into the valve seat of the fuel injector in the closing direction by lowering valve plunger 6 and the injection procedure is ended.

As may be seen in FIG. 1, valve plunger 6 is guided, at its end facing away from the valve needle, in a cylindrical bore 11 incorporated in a valve piece 12 which is inserted into valve housing 4. In cylindrical bore 11, face 13 of valve plunger 6 encloses a control pressure chamber 14, which is connected to a high-pressure fuel connection via a supply channel. The supply channel is essentially implemented in three parts. A bore leading radially through the wall of valve piece 12, whose inner walls form a supply throttle 15 for part of their length, is continuously connected to a ring chamber 16, which surrounds the circumference of the valve piece, this ring chamber in turn being continuously connected, via a fuel filter inserted into the supply channel, to the high-pressure fuel connection of a coupling 9 screwable into valve housing 4. Ring chamber 16 is sealed in relation to longitudinal bore 5 via a sealing ring 39. Control pressure chamber 14 is subjected to the high fuel pressure prevailing in the high-pressure fuel storage cylinder via supply throttle 15. Coaxially to valve plunger 6, a bore which runs into valve piece 12 branches out of control pressure chamber 14, forming a fuel drain channel 17, provided with a drain throttle 18, which discharges into a relief chamber 19 which is connected to a low-pressure fuel connection 10, which in turn is connected to a fuel return line of fuel injector 1 in a way not shown. Fuel drain channel 17 exits from valve piece 12 in the region of a conically countersunk part 21 of the external face of valve piece 12. Valve piece 12 is rigidly clamped to valve housing 4 in a flange region 22 via a screw element 23.

A valve seat 24 is implemented in conical part 21, a control valve element 25 of a solenoid valve 30 that controls the fuel injector working together with this valve seat. Control valve element 25 is coupled with a two-part armature in the form of an armature pin 27 and an armature plate 28, this armature working together with an electromagnet 29 of solenoid valve 30. Solenoid valve 30 includes a housing part 60 enclosing the electromagnet, with the housing part being rigidly connected to valve housing 4 via screwable fasteners 7. In the known solenoid valve, armature plate 28 is mounted so it is dynamically movable on armature pin 27 under the effect of its inertial mass against the initial force of a return spring 35 and, in the idle state, is pressed by this return spring against a stop part 26 fixed in a ring groove 49 on the armature pin. The other end of return spring 35 is supported, fixed on the housing, on a flange 32 of a slider 34 guiding armature pin 27, which is rigidly clamped in the valve housing, using this flange, between a spacer disk 38, laid on valve piece 12, and screw element 23. Armature pin 27 and with it armature disk 28 and control valve element 25, coupled to the armature pin, are continuously acted upon by a closing spring 31, which is supported fixed on the housing, in the closing direction, so that control valve element 25 normally presses against valve seat 24 in the closed position. When the electromagnet is energized, armature plate 28 and also, via stop part 26, armature pin 27 are moved toward the electromagnet, through which drain channel 17 is opened toward relief chamber 19. A ring shoulder 33 is located on armature 27, between control valve element 25 and armature plate 28, which strikes against flange 32 when the electromagnet is energized and thus limits the opening stroke of control valve element 25. Spacer disk 38, arranged between flange 32 and valve piece 12, is used to set the opening stroke.

The opening and closing of the fuel injector is controlled by solenoid valve 30 as described in the following. Armature pin 27 is continuously acted upon by closing spring 31 in the closing direction, so that control valve element 25 presses against valve seat 24 in the closed position when the electromagnet is not energized and control pressure chamber 14 is closed toward relief side 19, so that the high pressure which is also applied in the high-pressure fuel storage cylinder quickly builds up there via the supply channel. Via the surface of face 13, the pressure in control pressure chamber 14 generates a closing force on valve plunger 6 and the valve needle connected thereto which is greater than the forces acting on the other side in the opening direction as a consequence of the high pressure applied. If control pressure chamber 14 is opened toward relief side 19 by opening the solenoid valve, the pressure in the small volume of control pressure chamber 14 decreases very quickly, since it is decoupled from the high-pressure side via supply throttle 15. As a consequence, the force acting on the valve needle in the opening direction coming from the fuel high pressure applied to the valve needle is greater, so that the valve needle moves upward and, at the same time, the at least one injection opening is opened for injection. However, if solenoid valve 30 closes fuel drain channel 17, the pressure in control pressure chamber 14 may be reduced again through the fuel flowing away via supply channel 15, so that the original closing force is applied and the valve needle closes the fuel injector.

When the solenoid valve is closed, closing spring 31 presses armature pin 27 with control valve element 25 abruptly against valve seat 24. A disadvantageous rebound or post-oscillation of the control valve element arises in that the impact of the armature pin on the valve seat causes an elastic deformation of the latter, which acts as an energy store, part of the energy being transmitted in turn to the control valve element, which then rebounds together with the armature pin from valve seat 24. The known solenoid valve shown in FIG. 1 therefore uses a two-part armature having an armature plate 28 decoupled from armature pin 27. The total mass striking the valve seat may be reduced in this way; however, armature plate 28 may post-oscillate in a disadvantageous way. Therefore, an overtravel stop, arranged between armature plate 28 and sliding sleeve 34, is used, which may be implemented in the form of a disk part provided with a recess, for example. The overtravel stop may, however, also be formed by the face of the slider facing armature plate 28. Spacer disk 38, slider 34, and the overtravel stop are clamped so they are fixed in the solenoid valve housing. The overtravel stop delimits the maximum possible movement path of armature plate 28 on armature pin 27. The post-oscillation of armature plate 28 is reduced by a hydraulic damping chamber formed between the overtravel stop and armature plate 28 and armature plate 28 returns more rapidly to its starting position-against stop part 26. However, setting the overtravel path and/or the maximum slide path of armature plate 28 on armature pin 27 is quite costly and is performed by replacing spacers or grinding down the slider.

A first exemplary embodiment of the present invention is illustrated in FIG. 2. Identical parts are provided with identical reference numbers. As may be seen, the solenoid valve according to the present invention uses an armature plate 28, on which an axially adjustable actuator 50 is arranged, on the side facing away from electromagnet 29. To set the maximum slide path of armature plate 28, actuator 50 may be adjusted, in the sliding direction of armature plate 28, relative to face 41 of armature plate 28 facing the electromagnet. For this purpose, various embodiments are possible. Actuator 50 may, for example, be a slide bushing. However, in the preferred exemplary embodiment illustrated here, actuator 50 is adjustably arranged on armature plate 28 via a thread and has, on its face 51 facing sliding sleeve 34, an axial through-opening 53 for passing through armature pin 27. Actuator 50 is implemented as a screw element provided with an internal thread 46, which is screwed onto a section 42 of armature plate 28 penetrated by armature pin 27 and provided with an external thread 45, this section 42 forming a stub of armature plate 28 projecting toward sliding sleeve 34. The actuator is shown in the left part of FIG. 2 in a starting position, in which it is screwed onto stub 42 up to the stop. To set the maximum slide path of armature plate 28, the actuator is screwed into the position shown in the right part of FIG. 2. This may be performed in such a way that actuator 50 is first unscrewed from stub 42 of armature plate 28 until its face 51 strikes against face 52 of slider 34. Subsequently, it is screwed back onto stub 42 at a defined distance, the desired overtravel path between face 51 of actuator 50 and face 52 of slider 34 being precisely set as a function of the thread pitch. Alternately, actuator 50 may also be fixed and armature plate 28 may be rotated until the correct overtravel path is set. The screw thread of the actuator preferably has a low thread pitch. In a preferred exemplary embodiment, the axial adjustment path of actuator 50 in relation to face 41 of armature plate 28 is 0.25 mm for one full rotation. Using special thread M7×0.25 (in accordance with DIN 134 T1.11 (12.86)), for example, an overtravel path of approximately 15 $\mu$m may be set by rotating the actuator by approximately 21°. Self locking of the thread may be assumed due to the flat thread pitch, so that actuator 50 does not move over time. If necessary, additional locking means may be provided. For this purpose UV-curable locking means may, for example, be used, which are hardened using a UV lamp after setting the overtravel path. As may be seen in the right part of FIG. 2, face 51 of actuator 50 and face 52 of stationary sliding sleeve 34 facing face 51 of the actuator form a hydraulic damping chamber between themselves, through which post-oscillation of armature plate 28 is damped.

Return spring 35 is supported on one end against flange 32 of slider 34 and on the other end against side 43 of armature plate 28 facing away from face 41, and encloses actuator 50, which is therefore accessible only with difficulty. A particular advantageous exemplary embodiment, in which actuator 50 is more easily accessible, is illustrated in FIG. 3. In contrast to the exemplary embodiment illustrated in FIG. 2, actuator 50 has a peripheral collar 55 in the lateral extension of its face 51 facing slider 34, against which return spring 35 is supported on the end facing away from slider 34. The left side of FIG. 3 shows the starting position and the right side shows the set limit position. As may be seen, actuator 50 is not enclosed by return spring 35 in FIG. 3 and is therefore more easily accessible for the setting process. Therefore, tools may be more easily used on the sides of the actuator. In this exemplary embodiment as well, the maximum slide path of armature plate 28 on armature pin 27 may be set precisely either by rotating the armature plate when the actuator is fixed or by rotating the actuator when the armature is fixed.

What is claimed is:

1. A solenoid valve for controlling a fuel injector of an internal combustion engine, comprising:

an electromagnet;

a movable armature including an armature plate and an armature pin, the armature plate being mounted on the armature pin;

a control valve element configured to move with the movable armature and cooperate with a valve seat, and configured to open and close a fuel drain channel of a control pressure chamber of the fuel injector; and a hydraulic damping device including a stationary part and a part movable with the armature plate;

wherein the armature plate is movable by sliding under an effect of an inertial mass of the armature plate in a closing direction of the control valve element against a tension of a return spring acting on the armature plate;

wherein the hydraulic damping device is configured to dampen a post-oscillation of the armature plate during a dynamic displacement of the armature plate on the armature pin; and wherein the part movable with the armature plate is formed by an actuator, the actuator being arranged on a section of the armature plate facing away from the electromagnet and, to set a maximum slide path of the armature plate, being adjustable in a sliding direction of the armature plate relative to a first face of the armature plate facing the electromagnet.

2. The solenoid valve as recited in claim 1, wherein, between a face of the actuator and an opposing face of the stationary part, a hydraulic damping chamber is provided, and wherein the hydraulic damping device is fixed in a housing of the solenoid valve.

3. The solenoid valve as recited in claim 1, wherein a face of the actuator facing the stationary part includes an axial through-opening for a lead-through of the armature pin.

4. The solenoid valve as recited in claim 1, wherein the actuator is adjustably arranged on the armature plate via a thread.

5. The solenoid valve as recited in claim 4, wherein the actuator includes a screw element provided with an internal thread, the screw element being screwed onto a section of the armature plate penetrated by the armature pin, the section being provided with an external thread.

6. The solenoid valve as recited in claim 4, wherein an axial adjustment path of the actuator in relation to a face of the armature plate facing the electromagnet is less than approximately half a millimeter for one full rotation of the actuator.

7. The solenoid valve as recited in claim 1, wherein the actuator is lockable in a set position against the armature plate.

8. The solenoid valve as recited in claim 1, wherein the return spring is supported on a first end in a housing of the solenoid valve and supported on a second end against the actuator.

* * * * *

UNITED STATES PATENT AND TRADEMARK OFFICE

CERTIFICATE OF CORRECTION

PATENT NO. : 6,688,579 B2
DATED : February 10, 2004
INVENTOR(S) : Uwe Grytz

It is certified that error appears in the above-identified patent and that said Letters Patent is hereby corrected as shown below:

Column 1,
Line 6, change "Background Information" to -- Field of the Invention --
Lines 8-9, change "combustion engine according to the definition of the species in claim 1." to -- combustion engine. --
Line 10, insert heading -- Background Information --
Lines 11-12, change "Such a solenoid valve, known from German Patent Application 197 08 104 Al, for example," to -- A solenoid valve discussed in German Published Patent Application No. 197 08 104 A1 --
Lines 14-15, change "a valve plunger, using which..." to -- a valve plunger, which opens and closes --
Line 15, change "is opened or closed" to -- opens or closes --
Line 18, change "The known solenoid valve" to -- The conventional solenoid valve --
Line 20, change "control valve element, which is moved" to -- control valve element. The control valve element --
Line 24, change "A known disadvantage" to -- A disadvantage --
Lines 33-24, change "valve known from German Patent Application 197 08 104 Al," to -- valve discussed in German Published Patent Application No. 197 08 104 Al, --
Line 52, change "To achieve this object, the related art" to -- The related art --

Column 2,
Line 3, change "In the known solenoid valves," to -- In the conventional solenoid valves, --
Lines 8-10, change "Since these achievements...are costly and" to -- Since this requires an incrementally performed setting process, it is costly, --
Line 10, change "difficult to automate, and lengthen" to -- difficult to automate and lengthens --
Line 12, change "Advantages of the Invention" to -- Summary --
Lines 14-15, change "according to the present invention having the characterizing features of claim 1 avoids" to -- according to an exemplary embodiment of the present invention may avoid --
Lines 26-28, change "The achievement of the object proposed is particularly usable in a cost-effective way..." to -- An exemplary embodiment of the present invention may be produced in a cost-effective manner... --
Lines 29-31, delete "Advantageous embodiments...in the sub-claims."
Line 39, change "It is particularly advantageous" to -- It may be advantageous --
Line 45, change "in a simple way." to -- in a simple manner. --
Line 46, change "The actuator is preferably implemented" to -- The actuator may preferably be implemented --
Line 53, change "magnet is advantageously implemented" to -- magnet may be advantageously implemented --

CERTIFICATE OF CORRECTION

PATENT NO. : 6,688,579 B2 
DATED : February 10, 2004
INVENTOR(S) : Uwe Grytz

It is certified that error appears in the above-identified patent and that said Letters Patent is hereby corrected as shown below:

Column 2 (cont'd),
Line 55, change "thread pitch advantageously cause" to -- thread pitch may advantageously cause --
Line 59, change "which is particularly easy" to -- which may be particularly easy --
Line 63, change "Drawings" to -- Brief Description of the Drawings --
Lines 65-67, delete "Exemplary embodiments...the following description."

Column 3,
Line 2, change "fuel injector known from" to -- fuel injector from --
Line 3, change "valve," to -- valve. --
Line 5, change "according to the present invention" to -- according to an exemplary embodiment of the present invention --
Line 6, change "actuator," to -- actuator. --
Lines 11-12, change "Description of the Exemplary Embodiments" to -- Detailed Description --
Lines 14-15, change "injector 1 known from the related art" to -- injector 1 from the related art --
Lines 20-21, change "a nozzle body (not shown)." to -- a nozzle body. --
Line 40, change "channel is essentially" to -- channel may be essentially --
Line 55, change "way not shown." to -- manner not shown. --

Column 4,
Line 5, change "In the known solenoid" to -- In the conventional solenoid --
Line 61, change "valve element arises" to -- valve element may arise --
Line 66, change "the known solenoid" to -- the conventional solenoid --

Column 5,
Line 3, change "this way, however," to -- this manner, however, --
Line 4, change "a disadvantageous way." to -- a disadvantageous manner. --
Line 24, change "according to the present invention" to -- according to an exemplary embodiment of the present invention --
Line 46, change "way that actuator 50" to -- manner that actuator 50 --
Line 54, change "actuator preferably has" to -- actuator preferably may have --
Line 58, change "(12.86)), for example" to -- (12.86); DIN stand
for Deutsches Institut für Normung e.V. (The German Institute for Standardization, which is similar to US ANSI)), for example, --

UNITED STATES PATENT AND TRADEMARK OFFICE

CERTIFICATE OF CORRECTION

PATENT NO. : 6,688,579 B2
DATED : February 10, 2004
INVENTOR(S) : Uwe Grytz

It is certified that error appears in the above-identified patent and that said Letters Patent is hereby corrected as shown below:

Column 6,
Line 7, change "which is therefore accessible" to -- which may therefore be accessible --
Lines 8-9, change "A particularly advantageous exemplary embodiment" to -- An exemplary embodiment --

Signed and Sealed this

Second Day of August, 2005

JON W. DUDAS
*Director of the United States Patent and Trademark Office*